3,450,783
METHOD FOR PRODUCTION OF CYCLOHEXANE
George E. Merryfield, deceased, late of Bartlesville, Okla., by Darall G. Hawk, Administrator, Bartlesville, and John T. Cabbage, Bartlesville, Okla., assignors to Phillips Petroleum Company, a corporation of Delaware
Filed Aug. 8, 1966, Ser. No. 571,140
Int. Cl. C07c 5/10
U.S. Cl. 260—667                10 Claims

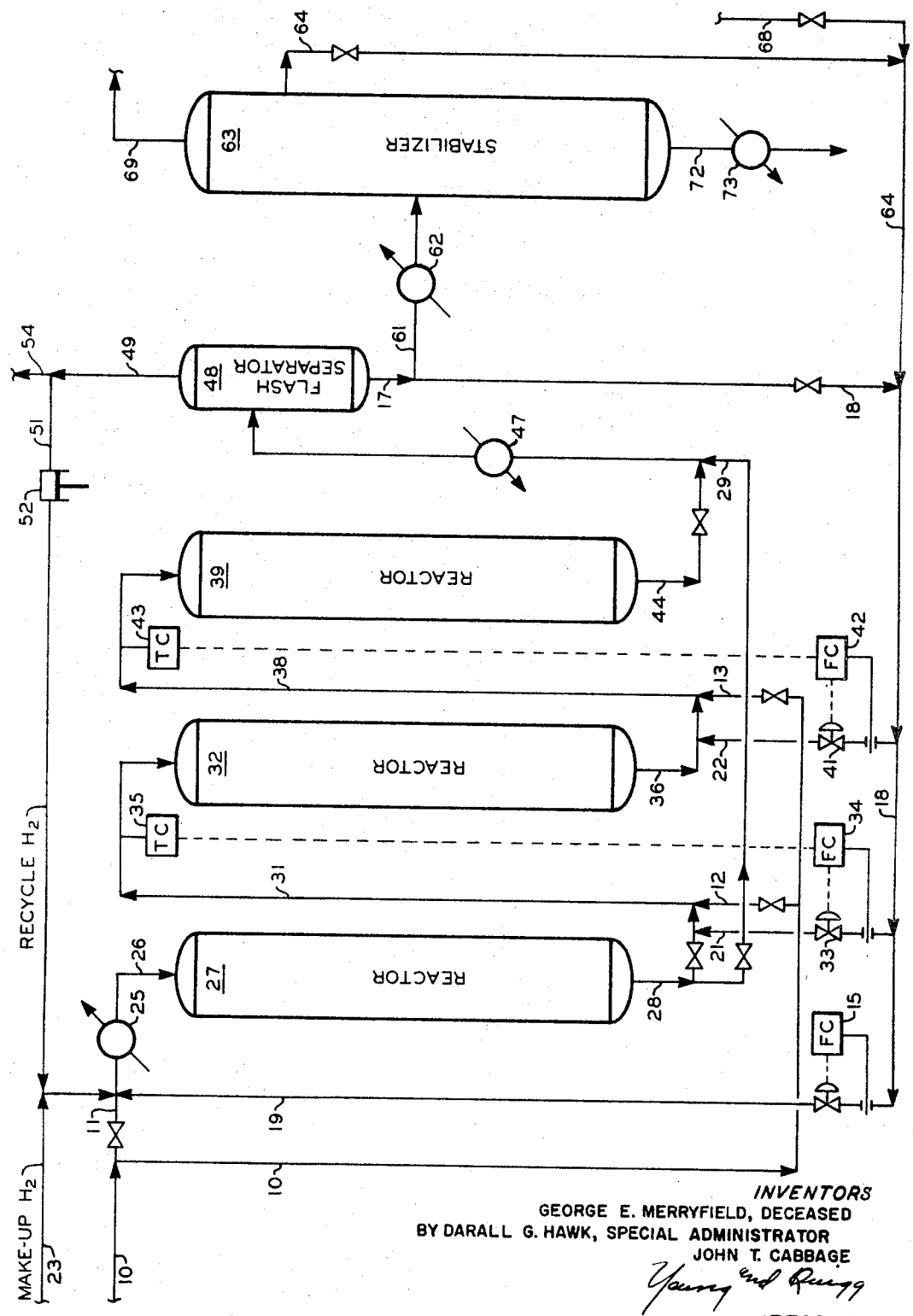

ABSTRACT OF THE DISCLOSURE

Benzene is hydrogenated to cyclohexane in the presence of a diluent selected from the group consisting of normal pentane, isopentane, and mixtures thereof.

---

This invention relates to a method for the production of cyclohexane.

The hydrogenation of benzene to produce cyclohexane is a well known reaction wherein one mol of benzene is reacted with 3 mols of hydrogen in the presence of a suitable hydrogenation catalyst to form one mole of cyclohexane. The reaction is strongly exothermic, liberating 89,500 B.t.u.'s per pound mol of cyclohexane formed. This creates serious problems in carrying out the reaction on a commercial scale. When the reaction is carried out adiabatically on a feed stream containing more than relatively small amounts of benzene, the resulting temperature increase of equipment limitations and, more seriously, because of process difficulties such as loss of catalyst activity and the occurrence of side reactions. One side reaction which must be avoided at all costs is a demethylation-hydrogenation reaction which results in runaway temperatures. In the past, attempts have been made to solve this problem in various ways such as by reducing the concentration of benzene in the feed stream charged to the hydrogenation reactor, reducing the inlet temperature on said feed stream, and by employing reactors provided with elaborate cooling means, either as interstage cooling in systems employing a plurality of reactors or elaborate internal cooling means in systems wherein only one reactor is employed.

When employing presently known catalysts, the temperature on the inlet feed stream to the hydrogenation zone (initial reaction temperature) should not be less than about 300 to about 400° F. in order to obtain a reasonable reaction rate. In order to prevent the above-mentioned demethylation-hydrogenation reaction and other undesirable side reactions, the temperature on the effluent from the hydrogenation zone (final reaction temperature) should not be greater than about 450 to about 600° F., preferably not greater than about 550° F. Thus, the maximum desirable increase in temperature of the process stream across a reactor is about 300° F., preferably about 150 to 200° F.

One method of temperature control which has been employed in the prior art is to carry out the hydrogenation in the presence of added cyclohexane diluent. However, in processes for the hydrogenation of benzene to cyclohexane a small amount of cyclohexane is converted to other hexanes, e.g., normal hexane. Said other hexanes are difficult to separate from the cyclohexane product because of the closeness in boiling points. Thus, said other hexanes usually end up in the cyclohexane product. This is undesirable where it is desired that the cyclohexane product be of high purity, e.g., essentially pure cyclohexane. We have found that the problem is aggravated when a portion of the cyclohexane product is recycled as diluent because the concentration of said other hexane impurities tends to build up in the cyclohexane product and can be as high as 0.5 percent, or greater.

We have found that the above difficulties can be eliminated or mitigated by employing normal pentane and/or isopentane as the diluent in the hydrogenation of benzene to cyclohexane. As shown by the examples given hereinafter, employing said pentanes as the diluent makes possible the production of an essentially pure cyclohexane product in higher yields. Thus, the present invention is an improvement over other processes for the hydrogenation of benzene to cyclohexane which are carried out in the presence of a cyclohexane diluent.

Thus, in one broad aspect, in a process for the catalytic hydrogenation of benzene to produce cyclohexane, the present invention resides in the improvement of carrying out said hydrogenation in the presence of normal pentane, isopentane, or mixtures thereof, as a diluent.

An object of this invention is to provide an improved process for the hydrogenation of benzene. Another object of this invention is to provide an improved process for the production of pure cyclohexane by the hydrogenation of pure benzene. Another object of this invention is to provide an improved process for the hydrogenation of benzene to cyclohexane in the presence of a pentane diluent. Still another object of this invention is to provide a method for controlling the temperature in the individual reaction zones of a process for the hydrogenation of benzene to cyclohexane, said process being carried out in a plurality of reaction zones in the presence of a pentane diluent. Other aspects, objects, and advantages of the invention will be apparent to those skilled in the art in view of this disclosure.

Thus, according to the invention, there is provided a process for the production of cyclohexane, which process comprises: contacting a mixture comprising a benzene feed stream, and excess of hydrogen, and a diluent stream selected from the group consisting of normal pentane, isopentane, and mixtures thereof with a hydrogenation catalyst under hydrogenating conditions in a contacting zone, and recovering cyclohexane product from the effluent from said contacting zone.

Both normal pentane and isopentane are well suited for use as a diluent in accordance with the invention. Both of said pentanes are readily separated from cyclohexane by distillation and both are inert and stable under the hydrogenation conditions. Where both of said pentanes are equally available, isopentane is generally preferred because of its lower boiling point. Said pentanes are employed in amounts sufficient to control the temperature in the hydrogenation zone(s) so that said temperatures does not exceed about 600° F. Usually said pentanes will be employed in a volume ratio of pentane to benzene within the range of from 5:1 to 100:1, preferably about 7:1 to about 30:1.

A number of advantages are realized in the practice of the invention. Included among these advantages are: (a) increased benzene throughput resulting in marked increase in production rate of cyclohexane product; (b) reduced loss of cyclohexane product to hexanes other than cyclohexane when operating at conditions to obtain said increase in production rate; and (c) cyclohexane product of increased purity when operating at conditions to obtain said increase in production rate.

The invention is particularly suitable for the hydrogenation of benzene feed streams having a high concentration of benzene, e.g., 90 weight percent or greater. However, benzene feed streams of lower concentration can also be hydrogenated in accordance with the invention. Since the purity of the cyclohexane product is dependent upon the purity of the benzene feed stream, as explained further hereinafter, it is frequently preferred that said benzene feed stream contain at least 99 weight percent benzene, more preferably at least 99.5 weight percent benzene, when a high purity cyclohexane product is desired. The various benzene feed streams which can be employed in the practice of the invention can be obtained from any suitable source. For example, mixtures of hydrocarbons containing from about 20 to about 80 volume percent benzene can be obtained from various petroleum refinery operations.

Processes are available whereby high purity benzene can be recovered from such petroleum fractions. This can be done on a commercial scale by a combination of distillation and extraction techniques. In such a process a hydrocarbon fraction is separated which contains benzene and other hydrocarbons boiling in the benzene range. This fraction can be taken so that benzene is the only aromatic compound present. The benzene-containing fraction is then subjected to solvent extraction using a suitable solvent which is highly selective for aromatics and will selectively extract the benzene, leaving the other hydrocarbons. The benzene thus extracted is readily recovered from the solvent by distillation. Benzene obtained by such methods is essentially pure having a benzene content of at least 99.0, usually 99.5, weight percent or higher. It is also within the scope of the invention to employ high purity benzene from other sources.

Since a wide variety of catalysts can be employed in the practice of the invention, it is not intended to limit the invention to any particular catalyst. Any suitable hydrogenation catalyst can be employed. Catalysts suitable for use in the practice of the invention are those which are capable of causing the hydrogenation of benzene to cyclohexane. Examples of such catalysts include, among others, the following: nickel, platinum, palladium, iron, Raney nickel, etc. These materials are generally finely divided and are composited with a porous support or carrier such as the various forms of alumina, silica, alumina-silica coprecipitate, kieselguhr, diatomaceous earth, magnesia, zirconia, or other inorganic oxides, either alone or in combination. Many forms of such catalysts are available commercially. A presently preferred catalyst for use in the practice of the invention is nickel composited with kieselguhr.

The hydrogen employed in the practice of the invention can be obtained from any suitable source. Said hydrogen can be either electrolytic hydrogen of high purity or can be a hydrogen-containing stream recovered from catalytic reforming operations, or other petroleum refining operations. In order to maintain the catalyst at a high level of activity the hydrogen-containing stream recovered from said reforming or other operations is usually scrubbed with a strong caustic solution or passed through a bed of flake caustic (NaOH) to remove sulfur compounds. It is also preferred to remove the $C_4$ and heavier hydrocarbon materials contained in such streams by contacting the gas stream with a suitable absorbent as in conventional absorption processes.

Referring now to the drawing, the invention will be more fully explained. Said drawing is a diagrammatic flow sheet and illustrates various embodiments of the invention. It will be understood that many valves, pressure gauges, pumps, control instruments, etc., not necessary for explaining the invention to those skilled in the art, have been omitted so as to simplify said drawing. The description of said drawing has been combined with Example I for the sake of brevity. Said Example I describes a process for the hydrogenation of benzene using a cyclohexane diluent in accordance with a presently preferred embodiment of said copending application.

Example I

Referring now to said drawing, a feed stream comprising benzene at a temperature within the range of about 50 to about 150° F. is introduced via conduit 10 and is then divided into three approximately equal portions in conduits 11, 12, and 13. If desired, the amount of benzene flowing through said conduits 11, 12, and 13 can be controlled by suitable flow controllers operatively connected to motor valves in said conduits. A cyclohexane diluent stream (obtained from a source described hereinafter) in conduit 18 is divided into three portions in conduits 19, 21, and 22. A stream of compressed hydrogen-containing gases, essentially sulfur free, is introduced via conduit 23 and is combined with the portion of benzene feed stream in conduit 11 and the portion of cyclohexane diluent from conduit 19. The resulting feed mixture comprising benzene, cyclohexane, and hydrogen is passed through preheater 25, here shown to be an indirect heat exchanger but which can be any suitable type of heating means, and is therein heated to a temperature of about 320° F. If desired, the effluent from the final reactor can be employed as heat exchange medium in said heat exchanger 25 to obtain at least a portion of the desired increase in temperature of said feed mixture.

The preheated feed mixture in conduit 26 is then introduced into a first reactor 27 wherein it contacts a bed of nickel on kieselguhr catalyst. Said reactor 27 is operated at a pressure of about 480 p.s.i.a. A reaction mixture effluent comprising cyclohexane and hydrogen is withdrawn from said reactor 27 at a final reaction temperature of about 435° F. via outlet conduit 28.

Said reactor effluent is mixed in conduit 28 with a second portion of cyclohexane diluent from conduit 21 and the resulting mixture is then passed into conduit 31 where it is mixed with a second portion of the benzene feed stream from conduit 12. The resulting mixture is then introduced into the top portion of a second reactor 32 at a temperature of about 320° F. The amount of cyclohexane diluent flowing through said conduit 21 is controlled by means of motor valve 33 actuated by flow controller 34 which in turn is reset by temperature controller 35 responsive to the temperature of the mixture in said conduit 31 at a point therein, preferably just prior to the entry of said mixture into said reactor 32.

A second reactor effluent having a composition similar to the effluent from reactor 27 and comprising cyclohexane and hydrogen is withdrawn from said reactor 32 at a final reaction temperature of about 435° F. via outlet conduit 36. A third portion of cyclohexane diluent from conduit 22 is mixed with the reactor effluent in conduit 36 and the resulting mixture is then introduced into conduit 38 wherein it is mixed with a third portion of the benzene feed stream from conduit 13. The resulting mixture at a temperature of about 320° F. is then introduced into the upper portion of a third reactor 39. The amount of said third portion of cyclohexane diluent flowing through conduit 22 is controlled by means of motor valve 41 actuated by flow controller 42 which in turn is reset by temperature controller 43 responsive to the temperature of the contents in said conduit 38, preferably just prior to the entry of said contents into said reactor 39.

A third reactor effluent having a composition similar to the effluent from reactors 27 and 32 and comprising a mixture of hydrogen and cyclohexane is withdrawn from said reactor 39 at a final reaction temperature of about 435° F. via outlet conduit 44. Said reactor effluent is passed through cooler 47 wherein its temperature is reduced to a temperature within the range of about 50 to about 150° F., preferably about 100° F. The cooled effluent is then passed into a flash separator 48 wherein a liquid phase and a gaseous phase are separated. Said gaseous phase, which has a high hydrogen content but which also contains some low boiling hydrocarbons originally present in the hydrogen introduced via conduit 23, is withdrawn from separator 48 via conduit 49. Said flash separator 48 is conveniently operated at a pressure of about 425 p.s.i.a. and a temperature of about 100° F. At least a portion of the gaseous phase in said conduit 49 is discharged from the system via conduit 54 so as to control the accumulation or buildup of "inerts," e.g., methane and ethane. The amount of said gaseous phase so discharged can be controlled by a suitable flow controller in known manner. At least a portion of the gaseous phase from conduit 49 is passed via conduit 51, compressed in compressor 52, and then combined as recycle hydrogen with the fresh or make-up hydrogen originally introduced via conduit 23.

The liquid phase in flash separator 48 comprises the raw cyclohexane product of the process. Said liquid phase is withdrawn from flash separator 48 via conduit 17 and portions thereof, controlled by flow controllers 15, 34, and 42, are utilized as the cyclohexane diluent as previously described.

The remainder of said raw cyclohexane product is passed via conduit 61 and preheater 62 wherein it is heated to a temperature of about 215° F., and then into cyclohexane stabilizer 63 which can comprise a conventional fractionating column provided with conventional reboiler heating means in the bottom thereof and conventional overhead vapor condensing and reflux liquid accumulating means for the operation of said stabilizer in conventional manner. The drawing shows the removal of uncondensed gases schematically through conduit 69. The stabilized cyclohexane product of the process is withdrawn from stabilizer 63 via conduit 72 and cooler 73 and then passed to storage.

The various flow rates employed in the above-described example are given below in Table I where the stream numbers refer to the appropriate line or conduit numbers shown in the drawing. In said Table I all flow rates are given in mols per day. The cyclohexane product produced in this example has a purity of about 99.8 weight percent.

Example II

The run described in this example is carried out in essentially the same manner as the run described above in Example I, except that the outlet temperature from each of hydrogenation reactors 27, 32, and 39 is increased to about 475° F. Thus, instead of a temperature increase of about 115° F. across each reactor, a temperature increase of about 155° F. is taken. The various flow rates in this example are given below in Table II where the stream numbers refer to the appropriate line or conduit numbers shown in the drawing. The cyclohexane product produced in this Example II has a purity of about 99.0 weight percent.

Comparing said Table II with Table I shows that the increase in reactor outlet temperature permits the amount of benzene charged to the system to be increased from 431 mols per day to 582 mols per day, an increase of 151 mols or 35.0 percent. However, it will be noted that the purity of the cyclohexane product has decreased from about 99.8 weight percent in Example I to about 99.0 weight percent in Example II. This decrease in product purity is due to the presence of hexanes other than cyclohexane. Such a decrease in product purity is undesirable where a high purity product is needed.

Example III

The run described in this example is carried out in essentially the same manner as the run described in Example II above except that isopentane is employed as the diluent. The outlet temperatures on reactors 27, 32, and 39 are about 475° F. as in said Example II. The use of a pentane as diluent requires a change in the product separation system. All the liquid from flash separator 48 is passed via conduits 17, 61, and heater 62 into stabilizer 63. The pentane diluent is removed from said stabilizer as a side stream via conduit 64 and passed into conduit 18 for recycle. Cyclohexane product is withdrawn via conduits 72 as before. It will be understood that stabilizer 63, while shown as one tower in the drawing, can comprise two or more towers as required to make the desired degree of separation required. The various flow rates in this example are given below in Table III. The cyclohexane product produced in this Example III has a purity of about 99.7 weight percent.

Comparing said Table III with Tables II and I shows that the yield of cyclohexane is about one percent higher in Example III than in Example II. The product purity is much improved in Example III to about 99.7 weight percent, as compared to about 99.0 weight percent in Example II. It will be noted that the impurity in Example III is due to the presence of one mol of other hexanes and one mol of the pentane diluent in the cyclohexane product. The pentane impurity can be reduced by a small increase in fractionation efficiency in stabilizer zone 63. In contrast, the impurity in Example II is due to the presence of six mols of hexane other than cyclohexane. These other hexanes cannot be readily removed by increasing fractionation efficiency.

It should be noted that in Example III when using a pentane diluent the 35 percent increase in system throughput has been retained, and the product is still better than 99.5 weight percent pure cyclohexane. In contrast, Example II shows that in a system using cyclohexane as diluent, when the reactor outlet temperature is increased to obtain an increase in throughput, there is obtained an increase in the production of hexanes other than cyclohexane, with a corresponding decrease in cyclohexane product purity.

TABLE I.—STREAM NO. AND COMPOSITION (EXAMPLE I), MOLS PER STREAM HOUR

[Reactor inlet temp.=320° F.; Reactor outlet temp.=435° F.; Cyclohexane recycle]

| Component | 10 | 23 | 19 | 51 | 11 | 26 | 28 | 21 | 12 | 31 | 36 |
|---|---|---|---|---|---|---|---|---|---|---|---|
| Hydrogen | | 1,357 | 8 | 1,895 | | 3,260 | 2,828 | 2 | | 2,830 | 2,398 |
| Methane | | 71 | 110 | 1,356 | | 1,537 | 1,537 | 30 | | 1,567 | 1,567 |
| Ethane through n-Butane | | | | | | | | | | | |
| Pentanes | | | | | | | | | | | |
| Other Hexanes | | | 4 | | | 4 | 4 | 1 | | 5 | 5 |
| Cyclohexane | | | 1,744 | 77 | | 1,822 | 1,966 | 475 | | 2,441 | 2,585 |
| Benzene | 431 | | | | 144 | 144 | | | 144 | 144 | |
| Total, Mols/Hr | 431 | 1,428 | 1,866 | 3,328 | 144 | 6,767 | 6,335 | 508 | 144 | 6,987 | 6,555 |

| Component | 22 | 13 | 38 | 44 | 49 | 54 | 17 | 18 | 61 | 69 | 72 |
|---|---|---|---|---|---|---|---|---|---|---|---|
| Hydrogen | 2 | | 2,400 | 1,970 | 1,956 | 61 | 14 | 12 | 2 | 2 | |
| Methane | 28 | | 1,595 | 1,595 | 1,400 | 44 | 195 | 168 | 27 | 27 | |
| Ethane through n-Butane | | | | | | | | | | | |
| Pentanes | | | | | | | | | | | |
| Other Hexanes | 1 | | 6 | 7 | | | 7 | 6 | 1 | | 1 |
| Cyclohexane | 440 | | 3,025 | 3,167 | 80 | 3 | 3,087 | 2,659 | 428 | 1 | 427 |
| Benzene | | 143 | 143 | | | | | | | | |
| Total, Mols/Hr | 471 | 143 | 7,169 | 6,739 | 3,436 | 108 | 3,303 | 2,845 | 458 | 30 | 428 |

TABLE II.—STREAM NO. AND COMPOSITION (EXAMPLE II), MOLS PER STREAM HOUR

[Reactor inlet temp.=320° F.; Reactor outlet temp.=475° F.; Cyclohexane recycle]

| Component | 10 | 23 | 19 | 51 | 11 | 26 | 28 | 21 | 12 | 31 | 36 |
|---|---|---|---|---|---|---|---|---|---|---|---|
| Hydrogen | | 1,837 | 10 | 2,577 | | 4,424 | 3,840 | 3 | | 3,843 | 3,259 |
| Methane | | 96 | 149 | 1,886 | | 2,131 | 2,131 | 40 | | 2,171 | 2,171 |
| Ethane through n-Butane | | | | | | | | | | | |
| Pentanes | | | | | | | | | | | |
| Other Hexanes | | | 24 | | | 24 | 26 | 6 | | 32 | 34 |
| Cyclohexane | | | 2,337 | 94 | | 2,431 | 2,623 | 637 | | 3,260 | 3,452 |
| Benzene | 582 | | | | 194 | 194 | | | 194 | 194 | |
| Total, Mols/Hr | 582 | 1,933 | 2,520 | 4,557 | 194 | 9,204 | 8,620 | 686 | 194 | 9,500 | 8,916 |

| Component | 22 | 13 | 38 | 44 | 49 | 54 | 17 | 18 | 61 | 69 | 72 |
|---|---|---|---|---|---|---|---|---|---|---|---|
| Hydrogen | 3 | | 3,262 | 2,678 | 2,659 | 82 | 19 | 16 | 3 | 3 | |
| Methane | 38 | | 2,209 | 2,209 | 1,946 | 60 | 263 | 227 | 36 | 36 | |
| Ethane through n-Butane | | | | | | | | | | | |
| Pentanes | | | | | | | | | | | |
| Other Hexanes | 6 | | 40 | 42 | | | 42 | 36 | 6 | | 6 |
| Cyclohexane | 589 | | 4,041 | 4,233 | 97 | 3 | 4,136 | 3,563 | 573 | 1 | 572 |
| Benzene | | 194 | 194 | | | | | | | | |
| Total, Mols/Hr | 636 | 194 | 9,746 | 9,162 | 4,702 | 145 | 4,460 | 3,842 | 618 | 40 | 578 |

TABLE III.—STREAM NO. AND COMPOSITION (EXAMPLE III), MOLS PER STREAM HOUR

[Reactor inlet temp.=320° F.; Reactor outlet temp.=475° F.; Isopentane recycle]

| Component | 10 | 23 | 19 | 51 | 11 | 26 | 28 | 21 | 12 | 31 | 36 |
|---|---|---|---|---|---|---|---|---|---|---|---|
| Hydrogen | | 1,865 | | 2,137 | | 4,002 | 3,419 | | | 3,419 | 2,836 |
| Methane | | 98 | | 573 | | 671 | 671 | | | 671 | 671 |
| Ethane through n-Butane | | | | | | | 2 | | | 2 | 4 |
| Pentanes | | | 2,854 | 344 | | 3,198 | 3,197 | 780 | | 3,977 | 3,976 |
| Other Hexanes | | | | | | | | | | | |
| Cyclohexane | | | | | | | 194 | | | 194 | 388 |
| Benzene | 582 | | | | 194 | 194 | | | 194 | 194 | |
| Total, Mols/Hr | 582 | 1,963 | 2,854 | 3,054 | 194 | 8,065 | 7,483 | 780 | 194 | 8,457 | 7,875 |

| Component | 22 | 13 | 38 | 44 | 49 | 54 | 17-61 | 69 | 64 | 68 | 72 |
|---|---|---|---|---|---|---|---|---|---|---|---|
| Hydrogen | | | 2,836 | 2,252 | 2,193 | 56 | 59 | 59 | | | |
| Methane | | | 671 | 671 | 588 | 15 | 83 | 83 | | | |
| Ethane through n-Butane | | | 4 | 6 | | | 6 | 6 | | | 1 |
| Pentanes | 720 | | 4,696 | 4,695 | 353 | 9 | 4,342 | 1 | 4,340 | 14 | 1 |
| Other Hexanes | | | | 1 | | | 1 | | | | 1 |
| Cyclohexane | | | 388 | 581 | | | 581 | | | | 581 |
| Benzene | | 194 | 194 | | | | | | | | |
| Total, Mols/Hr | 720 | 194 | 8,789 | 8,206 | 3,134 | 80 | 5,072 | 149 | 4,340 | 14 | 583 |

It will be noted that no cooling or heat removal equipment is employed in the process of the invention between the inlet of reactor 27 and the outlet of final reactor 39. Thus, in the entire process from the inlet of first reactor 27 to the outlet of final reactor 39, no heat is added or removed except that which passes in or out via the process streams. This represents a marked advantage, not only in reduction of initial investment costs and maintenance costs of equipment as pointed out above, but also provides processing advantages because of the more uniform heat control.

In the practice of the invention, the operating conditions in reactors 27, 32, and 39 can vary over relatively wide ranges. However, said operating conditions are interrelated and when changing one variable consideration must be given to the effect on other variables. As indicated above, the reaction can be carried out at temperatures within the range of about 300 to about 600° F., preferably with a reactor outlet temperature of about 425 to about 525° F. The maximum desirable increase in temperature on the process stream through any reactor is about 300° F., preferably about 150 to about 200° F. The actual temperatures employed in said reactors will depend to some extent on the particular type of catalyst employed. More active catalysts make possible employing lower temperatures.

The pressure employed in said reactors 27, 32, and 39 is preferably from about 300 to about 500 p.s.i.a. Said pressures are not particularly critical. Pressure is employed primarily to increase the concentration or partial pressure of the hydrogen and thus aid the progress and completion of the primary reaction and minimize or eliminate side reactions. Thus, the above preferred pressures are those which have been found particularly suitable from a practical operating standpoint but are in no way critical or limiting upon the broad scope of the invention.

The amount of hydrogen present in the system is an excess over that required to hydrogenate benzene. Said hydrogen is usually present in an amount sufficient to provide a mol ratio of hydrogen to benzene within the range of about 4:1 to 50:1, preferably about 9:1 as a minimum.

The average space velocity (liquid basis) in the hydrogenation reactors can vary over a relatively wide range of from about 1 to 8, preferably about 2.5 to 4, volumes of benzene plus diluent per volume of catalyst per hour.

While the invention has been described in terms of employing a plurality of reactors comprising three reactors, it will be understood that said plurality of reactors can be less, e.g., 2, or more, e.g., 4, or more, reactors. Modification of the system illustrated in the drawing to employ less than or more than three reactors will be apparent to those skilled in the art in view of this disclosure. For example, if only two reactors are employed, outlet conduit 36 would be connected to conduit 44 and reactor 39 isolated from the system by means of suitable valves in the various conduits leading to and from said reactor 39, or reactor 39 would be eliminated entirely. The actual number of reactors employed in a given system will depend upon a number of factors including desired stream day capacity, purity of benzene feedstock, purity of cyclohexane product desired, amount of hydrogen recycle, amount of diluent recycle, and others. In general, we have found a system employing three reactors as described above to be quite flexible and adapted to accommodate a wide variety of processing conditions.

However, it is to be distinctly understood that the invention is not limited to employing a plurality of reactors. It is clearly within the scope of the invention to employ only one reactor, e.g., reactor 27. In such instance, outlet conduit 28 would be connected to conduit 29 and the effluent from reactor 27 passed directly to flash separator 48 and the remainder of the product and diluent separation equipment.

Also, while the invention has been described in terms of introducing equal amounts of benzene into the individual reactors of the system, it is within the scope of the invention to introduce unequal amounts of benzene into the individual reactors. The amount of benzene introduced into a reactor determines, to a large extent, the amount of exothermic reaction taking place and a measure of temperature control can be obtained by regulating the amount of benzene introduced. However, in general, we have found that effecting temperature control by regulating the quantity of benzene introduced into the individual reactors to be less efficient and thus unsatisfactory. Thus, in the preferred embodiment of the invention we prefer to introduce approximately equal amounts of benzene into the individual reactors and introduce an amount of a pentane diluent into each reactor which is sufficient to obtain the desired temperature control. For obvious reasons said diluent is preferably supplied as a recycled stream. However, it is within the scope of the invention to employ n-pentane and/or isopentane from any other source as said diluent. Make-up diluent can be supplied as needed via conduit 68.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A process for the production of cyclohexane, which process comprises: contacting a mixture comprising a benzene feed stream, an excess of hydrogen, and a diluent stream selected from the group consisting of normal pentane, isopentane, and mixtures thereof with a hydrogenation catalyst capable of hydrogenating benzene to cyclohexane under hydrogenating conditions capable of causing the hydrogenation of benzene to cyclohexane in a contacting zone, and recovering cyclohexane product from the effluent from said contacting zone.

2. A process according to claim 1 wherein said mixture is passed into said contacting zone at an initial reaction temperature within the range of from about 300 to about 400° F., and said effluent is withdrawn from said contacting zone at an elevated final reaction temperature not exceeding about 600° F.

3. A process according to claim 1 wherein said contacting zone comprises a plurality of contacting zones, said hydrogen is passed in series flow through each of said contacting zones, individual portions of said benzene are passed in parallel into individual contacting zones of said plurality of contacting zones, individual portions of said diluent are passed in parallel into individual contacting zones of said plurality of contacting zones, and said cyclohexane product is recovered from the effluent from the last contacting zone in said plurality of contacting zones.

4. A process according to claim 3 wherein the amount of said diluent supplied to each of said contacting zones is regulated to control the temperature therein so that the temperature in each of said contacting zones does not exceed about 600° F.

5. A process according to claim 4 wherein said diluent consists essentially of isopentane, said individual portions of benzene are approximately equal in amount, an effluent containing the unreacted portion of said excess hydrogen is withdrawn from each of said contacting zones, and said effluent from each of said contacting zones except the last contacting zone is passed to a succeeding contacting zone without separation of said unreacted hydrogen therefrom.

6. A process according to claim 4 wherein said individual portions of benzene are approximately equal in amount, said mixture is contacted in each of said contacting zones at an initial reaction temperature within the range of from about 300 to about 400° F., an effluent containing the unreacted portion of said excess hydrogen is withdrawn from each of said contacting zones, and said effluent from each of said contacting zones except the last contacting zone is passed to a succeeding contacting zone without separation of said unreacted hydrogen therefrom.

7. A process according to claim 1 wherein: (a) said benzene feed stream is divided into a plurality of approximately equal individual portions; (b) said individual portions of said benzene feed stream are passed individually at an initial reaction temperature within the range of from about 300 to about 400° F. in parallel into individual hydrogenation zones of a corresponding plurality of hydrogenation zones, each of said hydrogenation zones containing a hydrogenation catalyst; (c) said diluent stream is divided into a corresponding plurality of individual portions; (d) said individual portions of said diluent stream are passed individually in parallel into individual hydrogenation zones of said plurality of hydrogenation zones; (e) said hydrogen is passed into the first hydrogenation zone of said plurality of hydrogenation zones and in said first hydrogenation zone, benzene is hydrogenated to cyclohexane in the presence of said catalyst; (f) a reaction mixture effluent is withdrawn from said first hydrogenation zone at an elevated final reaction temperature not exceeding about 600° F.; (g) said effluent is passed into a succeeding hydrogenation zone of said plurality of hydrogenation zones together with said portion of said benzene feed stream and said portion of said diluent stream passed thereto, the amount of said diluent stream being an amount sufficient to reduce the temperature of said effluent to said initial reaction temperature; (h) said steps (f) and (g) are repeated for said succeeding hydrogenation zone and any further succeeding hydrogenation zones which succeed said first-mentioned succeeding hydrogenation zone except the last hydrogenation zone in said plurality of hydrogenation zones, whereby said individual portions of said benzene feed stream and said individual portions of said diluent stream are passed through said individual hydrogenation zones of said plurality of hydrogenation zones in parallel and said hydrogen passes through said plurality of hydrogenation zones in series; and (i) said cyclohexane product is recovered from the effluent from the last hydrogenation zone of said plurality of hydrogenation zones.

8. A process according to claim 1 wherein: (a) said benzene feed stream is divided into approximately equal first, second, and third portions; (b) said first portion of said benzene feed stream is mixed with said excess of hydrogen and with a first portion of said diluent stream and the resulting mixture is passed into said first hydrogenation zone at an initial reaction temperature within the range of from about 300 to about 400° F.; (c) cyclohexane is formed in said first hydrogenation zone by reacting benzene and hydrogen in the presence of a catalyst capable of catalyzing the hydrogenation of benzene; (d) a first effluent comprising unreacted hydrogen, diluent, and cyclohexane product is withdrawn from said first hydrogenation zone at an elevated final reaction temperature within the range of from about 425 to about 525° F.; (e) said first hydrogenation zone effluent is passed into said second hydrogenation zone together with said second portion of said benzene feed stream and said second portion of said diluent stream, the amount of said second portion of said diluent being an amount sufficient to reduce the temperature of said first effluent to an initial reaction temperature within the range of from about 300 to about 400° F.; (f) additional cyclohexane product is formed in said second hydrogenation zone by reacting benzene and hydrogen under hydrogenation conditions in the presence of a catalyst capable of catalyzing the hydrogenation of benzene; (g) a second hydrogenation zone effluent comprising unreacted hydrogen, diluent, and cyclohexane product is withdrawn from said second hydrogenation zone at an elevated final reaction temperature within the range of from about 425 to about 525° F.;

(h) said second hydrogenation zone effluent is passed into said third hydrogenation zone together with said third portion of said benzene feed stream and said third portion of said diluent stream, the amount of said diluent being an amount sufficient to reduce the temperature of said second hydrogenation zone effluent to an initial reaction temperature within the range of from about 300 to about 400° F.; (i) additional cyclohexane product is formed in said third hydrogenation zone by reacting benzene and hydrogen under hydrogenating conditions in the presence of a catalyst capable of catalyzing the hydrogenation of benzene; (j) a third hydrogenation zone effluent comprising unreacted hydrogen, diluent, and cyclohexane product is withdrawn from said third hydrogenation zone at an elevated final reaction temperature within the range of from about 425 to about 525° F.; and (k) said cyclohexane product is recovered from said third hydrogenation zone effluent.

9. A process according to claim 8 wherein said third hydrogenation zone effluent is cooled and passed to a flash separation zone, the liquid phase from said flash separation zone is passed to a fractionation zone, and a stream comprising said diluent is withdrawn from said fractionation zone and passed to said first, second, and third hydrogenation zones as said portions of said diluent stream.

10. A process according to claim 8 wherein the mol ratio of hydrogen to benzene is within the range of from 4:1 to 50:1.

References Cited
UNITED STATES PATENTS

| | | | |
|---|---|---|---|
| 2,755,317 | 7/1956 | Kassel | 260—667 |
| 3,213,151 | 10/1965 | Sherk | 260—667 |
| 3,228,858 | 1/1966 | Matyear | 260—667 |
| 3,301,911 | 1/1967 | Boatright | 260—666 |

DELBERT E. GANTZ, *Primary Examiner.*

V. O'KEEFE, *Assistant Examiner.*

U.S. Cl. X.R.

208—143; 260—666